(12) United States Patent
Dugas et al.

(10) Patent No.: US 10,091,934 B2
(45) Date of Patent: Oct. 9, 2018

(54) SYSTEM AND METHOD FOR CONTROLLED CLEANING IN A CANE HARVESTER

(71) Applicant: Deere & Company, Moline, IL (US)

(72) Inventors: Bryan E. Dugas, Napoleonville, LA (US); Peter Johnson, Moline, IL (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 15/340,543

(22) Filed: Nov. 1, 2016

(65) Prior Publication Data

US 2017/0251601 A1 Sep. 7, 2017

Related U.S. Application Data

(60) Provisional application No. 62/302,100, filed on Mar. 1, 2016.

(51) Int. Cl.

| | |
|---|---|
| *A01D 41/12* | (2006.01) |
| *A01F 12/44* | (2006.01) |
| *A01D 41/127* | (2006.01) |
| *A01D 45/10* | (2006.01) |
| *A01F 12/48* | (2006.01) |
| *A01F 12/56* | (2006.01) |

(52) U.S. Cl.
CPC ......... *A01D 41/1276* (2013.01); *A01D 45/10* (2013.01); *A01F 12/444* (2013.01); *A01F 12/48* (2013.01); *A01F 12/56* (2013.01)

(58) Field of Classification Search
CPC A01B 79/005; A01D 41/127; A01D 41/1276; A01D 75/00; A01D 75/28; A01D 75/282; A01D 41/126; A01D 45/10; A01F 12/444; A01F 12/448; A01F 12/28; A01F 12/48; A01F 12/56; G01N 15/1031; G01N 15/1459; G01N 15/1463; G01N 15/147; G01N 15/1475
USPC ...... 56/10.2 A–10.2 H, 10.2 R, 10.5, 53, 60, 56/61, 63, 11.9, 500; 73/861.73, 12.06, 73/12.09, 12.11, 12.13, 12.14; 701/50; 460/1, 4–6, 97, 99–102
See application file for complete search history.

(56) References Cited

U.S. PATENT DOCUMENTS

| | | | |
|---|---|---|---|
| 6,119,442 A | 9/2000 | Hale | |
| 6,272,819 B1 | 8/2001 | Wendte et al. | |
| 6,869,356 B2 | 3/2005 | Hinds | |
| 7,976,369 B2 * | 7/2011 | Craessaerts | A01F 12/448 460/6 |
| 8,626,400 B2 * | 1/2014 | Sheidler | A01F 12/444 460/1 |
| 9,526,211 B2 * | 12/2016 | Murray | A01D 41/1276 |
| 2012/0208607 A1 | 8/2012 | Ricketts et al. | |
| 2015/0342118 A1 | 12/2015 | Corbett et al. | |

* cited by examiner

*Primary Examiner* — Robert Eric Pezzuto
(74) *Attorney, Agent, or Firm* — Michael Best & Friedrich LLP

(57) ABSTRACT

A control system for a harvester having a crop cleaner for cleaning a cut crop. The control system includes a processor, a memory, and a human-machine interface. The processor is configured to receive an input corresponding to a desired cleaning level of the crop, monitor the actual cleaning level, and control the crop cleaner based on feedback from monitoring the actual cleaning level to move the cleaning level of the crop towards the desired cleaning level of the crop.

20 Claims, 6 Drawing Sheets

SYSTEM AND METHOD FOR CONTROLLED CLEANING IN A CANE HARVESTER

CROSS-REFERENCE TO RELATED APPLICATIONS

This application claims priority to U.S. Provisional Patent Application No. 62/302,100 filed on Mar. 1, 2016, the contents of which are incorporated by reference herein.

BACKGROUND

The present disclosure relates to a cane harvester and a method of controlling cane cleaning in a cane harvester that cuts and cleans a crop, such as sugar cane.

The harvester generally separates the crop into billets, which are ejected into a vehicle alongside the harvester, and residue, which is ejected back onto the field. The residue adds nutrients back into the soil for next season's crop. The billets are taken by the vehicle to a mill for processing, e.g., into sugar. The cleaning process does not necessarily separate all extraneous plant matter from the billets nor eject each and every billet into the vehicle. Some extraneous plant matter may be ejected into the vehicle and some billets may be ejected back onto the field. Extraneous plant matter ejected into the vehicle is also taken back to the mill, along with the billets, where it may be further separated from the billets and used as fuel.

SUMMARY

Various factors, such as fuel prices, distance from the mill, and the cost of replenishing soil nutrient levels, determine whether and how much extraneous plant matter is valuable at the mill. As such, it may be advantageous to adjust the level of crop cleaning to control the amount of extraneous plant matter ejected onto the field or taken to the mill.

In one aspect, the disclosure provides a control system for a harvester having a crop cleaner for cleaning a cut crop. The control system includes a processor, a memory, and a human-machine interface. The processor is configured to receive an input corresponding to a desired cleaning level of the crop, monitor an actual cleaning level, and control the crop cleaner based on feedback from monitoring the actual cleaning level to move the cleaning level of the crop towards the desired cleaning level of the crop.

In another aspect the disclosure provides a control system for a harvester having a fan for cleaning a crop and a motor for driving the fan. The control system includes a processor, a memory, and a human-machine interface. The processor is configured to receive a load signal corresponding to a load on the motor, and control the fan speed based at least in part on the load signal.

In yet another aspect, the disclosure provides harvester having an inlet for receiving a crop including stalks and extraneous plant matter, a blade for cutting the crop into billets and cut extraneous plant matter, and a separator. The separator includes a cleaning chamber for at least partially separating the billets and the cut extraneous plant matter, a crop cleaner for separating portions of the crop in the cleaning chamber, a motor operatively coupled to the fan, and a hood having a residue outlet. A sensor is configured to generate a load signal corresponding to a load on the separator, and a control unit is configured to receive the signal from the sensor. The control unit is programmed to quantify the crop ejected from the residue outlet based on at least the load signal.

In yet another aspect, the disclosure provides a control system for a harvester having a crop cleaner for cleaning a cut crop. The control system includes a processor, a memory, and a human-machine interface. The processor is configured to receive an input corresponding to a desired cleaning level of the crop, monitor the actual cleaning level, and control the harvester ground speed based on feedback from monitoring the actual cleaning level to move the cleaning level of the crop towards the desired cleaning level of the crop.

Specifically, the control includes adjusting the harvester ground speed to move the actual cleaning level of the crop during harvester operation towards the desired cleaning level of the crop.

In yet another aspect, the disclosure provides a control system for a harvester having a crop cleaner for cleaning a cut crop, the control system including a processor, a memory, and a human-machine interface. The processor is configured to receive an input corresponding to a desired cleaning level of the crop, monitor the actual cleaning level, and recommend to an operator a change in the harvester ground speed for effectuating a change in the cleaning level, wherein the recommendation is based on feedback from monitoring the actual cleaning level to move the cleaning level of the crop towards the desired cleaning level of the crop.

Specifically, the recommendation is configured to move the cleaning level of the crop towards the desired cleaning level of the crop. Also, the recommendation is displayed in a user interface. Also, the recommendation is in the form of a new ground speed. Also, the recommendation is in the form of a suggestion to increase or decrease ground speed.

Other aspects of the disclosure will become apparent by consideration of the detailed description and accompanying drawings.

DETAILED DESCRIPTION

Before any constructions of the disclosure are explained in detail, it is to be understood that the disclosure is not limited in its application to the details of construction and the arrangement of components set forth in the following description or illustrated in the accompanying drawings. The disclosure is capable of supporting other constructions and of being practiced or of being carried out in various ways.

Figure 1:
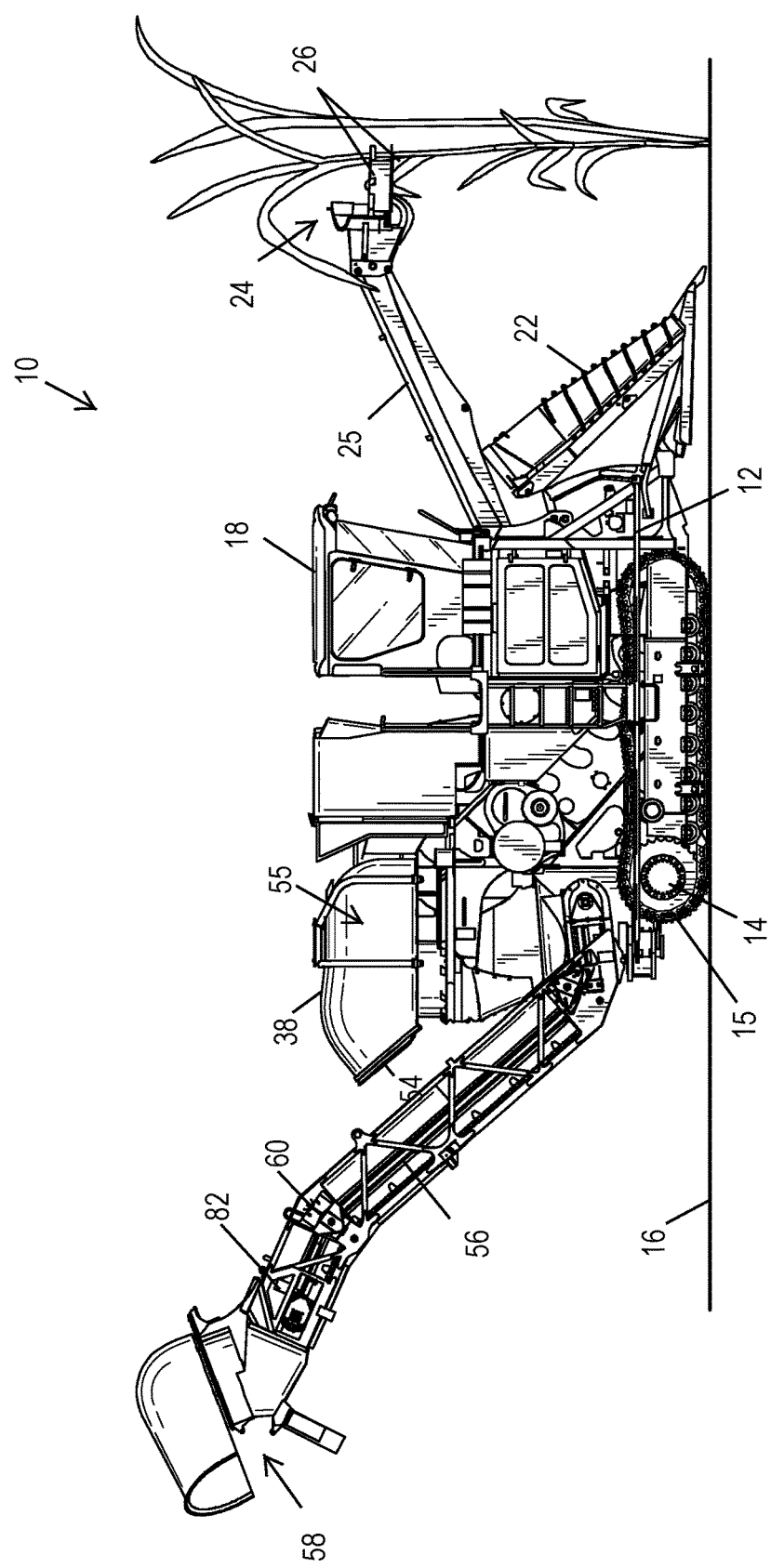
FIG. 1 is a side view of a harvester, such as a sugar cane harvester, having a separator and a controlled cleaning system in accordance with one implementation of the present disclosure.

FIG. 1 illustrates a harvester 10, such as a sugarcane chopper harvester, including a prime mover (not shown), such as an internal combustion engine, for providing motive power and a throttle 11 (FIG. 3) for controlling a speed of the prime mover and thus a ground speed of the harvester 10. The harvester includes a main frame 12 supported on wheels 14 having continuous tracks 15, tires, or other traction devices that engage a support surface 16 (e.g., the ground or field). The tracks 15 interact directly with the support surface 16 and are responsible for harvester 10 movement and tractive effort, although in other constructions the harvester 10 is provided only with wheels (rather than tracks as illustrated). An operator's cab 18 is mounted on the frame 12 and contains a seat 20 (FIG. 3) for an operator. A pair of crop lifters 22 having side by side augers or scrolls is mounted to the front of the frame 12, which operate on opposite sides of a row of crop to be harvested. The crop lifters 22 cooperate with a base cutter (not shown) including counter-rotating discs which cut off the stalks of crop close to the support surface 16. A topper 24 extends from the frame 12 on a boom 25. The topper 24 has a blade or blades 26 for cutting the tops off crop.

Figure 2:
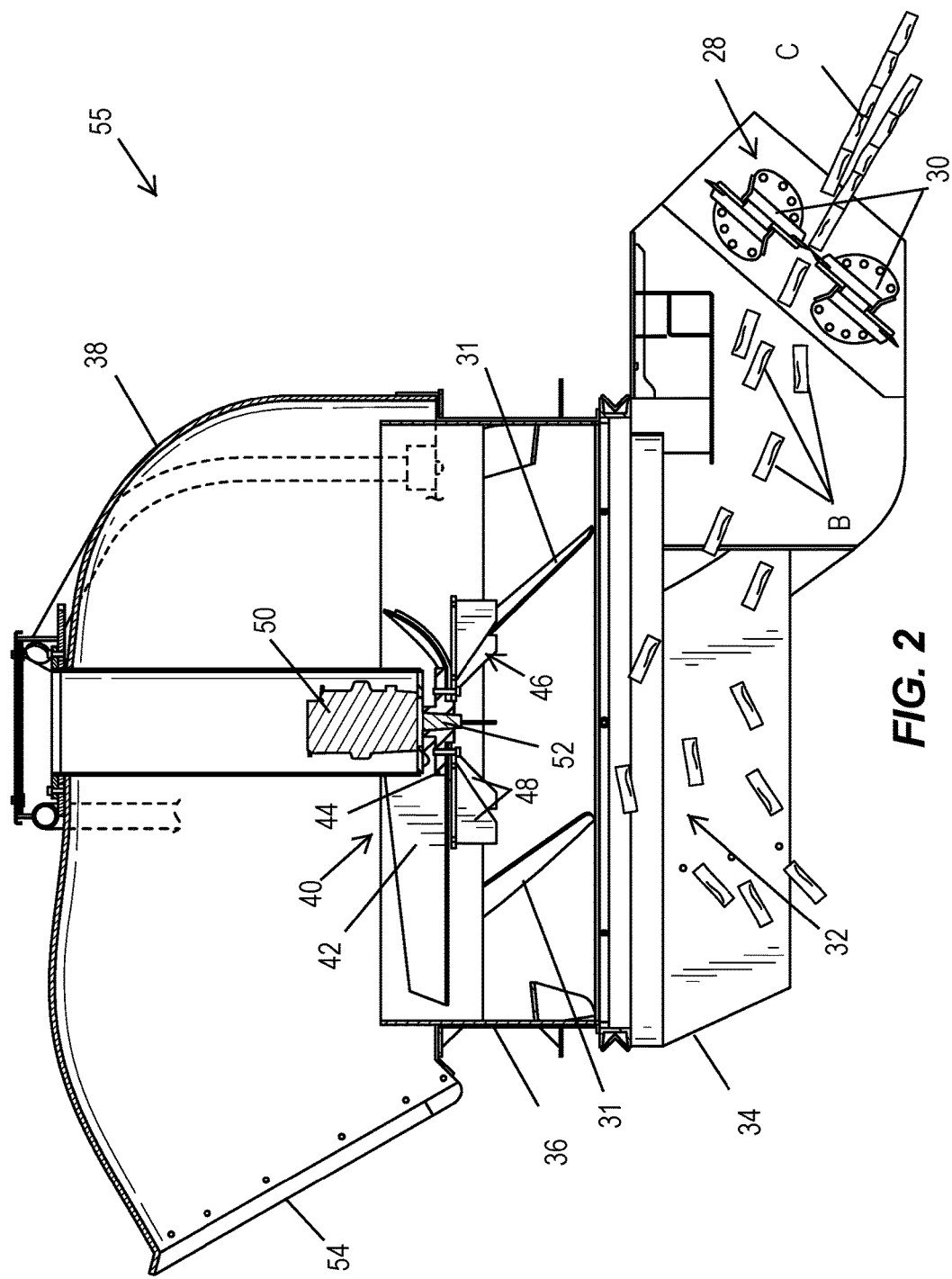
FIG. 2 is an enlarged cross-sectional view of the separator of FIG. 1.

FIG. 2 illustrates a cross section through a chopper 28 and a separator 55. The chopper 28 cuts the crop and the separator 55 receives the cut crop from the chopper 28 and generally separates the cut crop by way of a crop cleaner, which will be described in greater detail below. The crop cleaner may include any suitable mechanism for cleaning the cut crop, such as a fan (as in the illustrated construction that will be described below), a source of compressed air, a rake, a shaker, or any other mechanism that discriminates various types of crop parts by weight, size, shape, etc. in order to separate extraneous plant matter from billets. The separator 55 may include any combination of one or more of a cleaning chamber 32, a cleaning chamber housing 34, a crop cleaner such as a fan 40, a fan enclosure 36, a motor 50 driving the fan 40, a hood 38 having an opening 54, and a centrifugal blower wheel 46.

The separator 55 is coupled to the frame 12 and located downstream of the crop lifters 22 for receiving cut crop from the chopper 28. The chopper 28 includes counter-rotating drum cutters 30 with overlapping blades for cutting the stalks of crop, such as cane C, into billets B, which are pieces of the stalk. In other constructions, the chopper 28 may include any suitable blade or blades for cutting the stalks of crop. The crop also includes dirt, leaves, roots, and other plant matter, which will be collectively referred to herein as extraneous plant matter, which are also cut in the chopper 28 along with the cane C. The chopper 28 directs a stream of the cut crop (cut stalks, or billets B, and cut extraneous plant matter) to the cleaning chamber 32, which is generally defined by the cleaning chamber housing 34, the fan enclosure 36, and/or the hood 38, all of which are coupled to the frame 12 and located just downstream of the chopper 28 for receiving cut crop from the chopper 28. The fan enclosure 36 is coupled to the cleaning chamber housing 34 and may include deflector vanes 31.

The hood 38 is coupled to the fan enclosure 36 and has a domed shape, or other suitable shape, and includes an opening 54 angled out from the harvester 10 and facing slightly down onto the field 16. In some constructions, the opening 54 may be generally perpendicular to the drive shaft 52. The hood 38 directs cut crop through the opening 54 to the outside of the harvester 10, e.g., for discharging a portion of cut crop removed from the stream of cut crop back onto the field (as will be described in greater detail below).

Mounted for rotation in the cleaning chamber 32 is the fan 40. For example, the fan 40 may be in the form of an extractor fan having axial flow fan blades 42 radiating out from, and joined to, a hub 44. In the illustrated construction, the fan 40 (or other crop cleaner) is configured to draw air and extraneous plant matter from the cleaning chamber 32. In other constructions, the fan 40 (or other crop cleaner) may be configured to blow rather than extract, i.e., to blow or push the air through the cleaning chamber 32 to clean the crop. The fan 40 may include other types of fans with other types of blades, such as a centrifugal fan, amongst others. The centrifugal blower wheel 46 may be mounted for rotation with the fan 40 radially inwardly of the deflector vanes 31. For example, a plurality of generally right-angular blower blades 48 may be fixed to the underside of the centrifugal blower wheel 46 radiating out therefrom.

The motor 50, such as a hydraulic motor, includes a drive shaft 52 operatively coupled to drive the fan 40. For example, the drive shaft 52 may be keyed to the hub 44 or operatively coupled in other suitable ways to drive the fan 40. The motor 50 may also be operatively coupled to drive the centrifugal blower wheel 46 in a similar manner. In other constructions, the motor 50 may be electric, pneumatic, or may include any other suitable type of motor, an engine, or a prime mover to drive the fan 40 and/or the centrifugal blower wheel 46.

Referring again to FIG. 1, a conveyor 56 is coupled to the frame 12 for receiving cleaned crop from the separator 55. The conveyor 56 terminates at a discharge opening 58 (or outlet) elevated to a height suitable for discharging cleaned crop into a collection receptacle of a vehicle (not shown), such as a truck, wagon, or the like following alongside the harvester 10. A secondary cleaner 60 may be located adjacent the discharge opening 58 for cleaning the crop a second time before being discharged to the vehicle. For example, the secondary cleaner 60 may include a fan, compressed air, a rake, a shaker, or other suitable device for cleaning the crop.

Briefly, the billets B are generally separated from the extraneous plant matter in the cleaning chamber 32 as the fan 40 draws the generally lighter extraneous plant matter into the hood 38 and out the opening 54. All the cut crop directed through the opening 54, which is ejected back onto the field, is referred to herein as residue. Residue typically includes primarily the extraneous plant matter (which has generally been cut) and may include some billets B.

The cleaning chamber housing 34 directs the cleaned crop to the conveyor 56. The cleaned crop typically includes primarily billets B, although some extraneous plant matter may still be present in the cleaned crop. Thus, some extraneous plant matter may be discharged with the billets B from the discharge opening 58. Extraneous plant matter discharged from the discharge opening 58 to the vehicle is referred to herein as trash.

Figure 3:
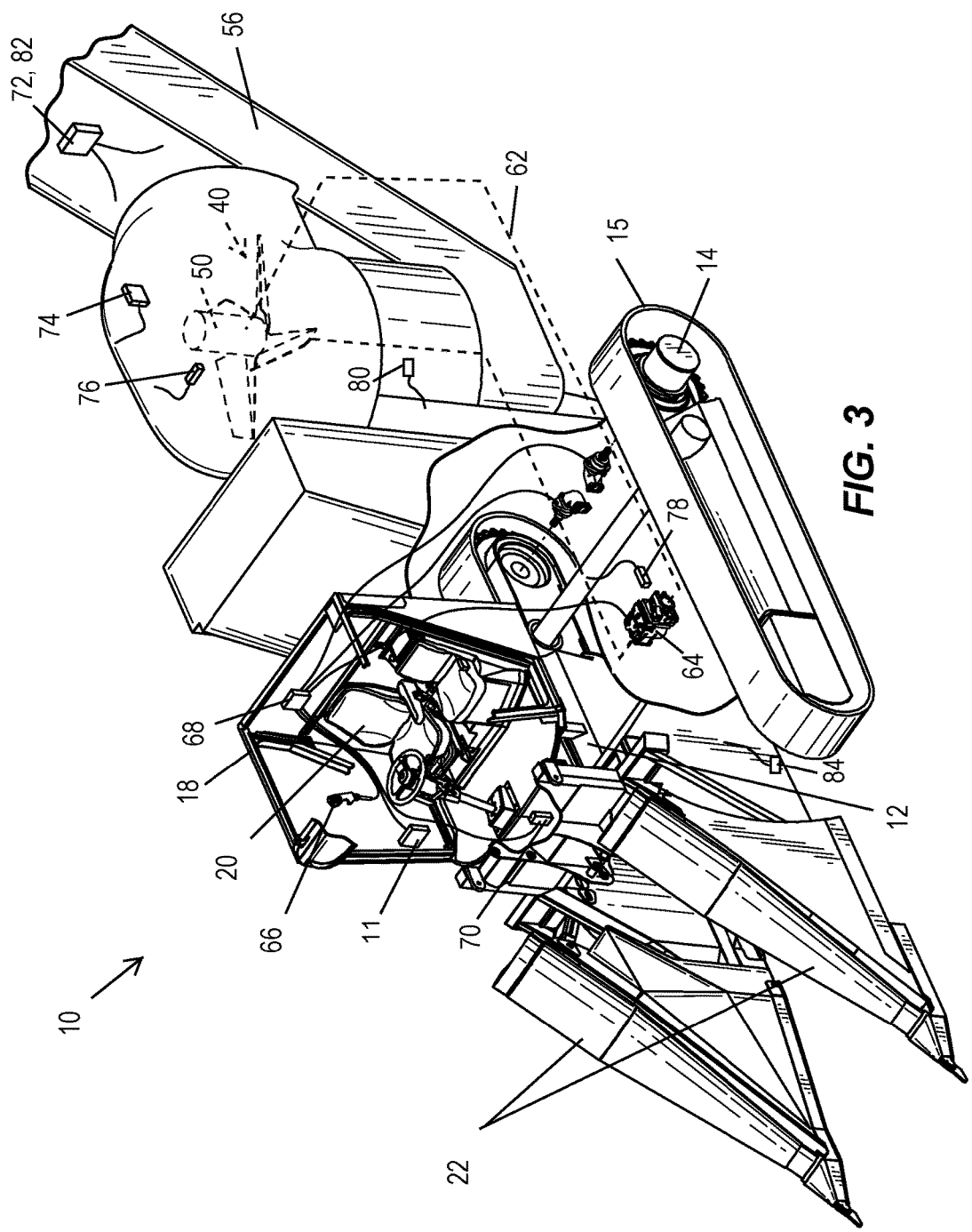
FIG. 3 is a perspective view of a portion of the harvester of FIG. 1.

Illustrated schematically in FIG. 3, a hydraulic circuit 62 for powering the motor 50 is operatively coupled thereto. In other constructions, the circuit 62 may be electric, pneumatic, may comprise mechanical linkages, etc. A detailed description of one example of a hydraulic circuit for a harvester fan can be found in U.S. Patent Publication No. 2015/0342118, jointly owned with the present application, the entire contents of which are incorporated herein by reference.

For example, the hydraulic circuit 62 is a closed-loop hydraulic circuit, which is powered by a pump 64. The pump 64 may be driven by the prime mover (not shown) of the harvester 10 or other power source.

With reference to FIG. 3, the harvester 10 also includes an operator interface 66 (e.g., a display, buttons, a touch screen, a graphical user interface, any combination thereof, or the like) with which a user can input settings, preferences, commands, etc. to control the harvester 10. The operator interface is operatively coupled with a control unit 68, such as a microprocessor-based electronic control unit or the like, for receiving signals from the operator interface 66 and from several sensors and for sending signals to control various components of the harvester 10 (examples of which will be described in greater detail below). Signals, as used herein, may include electronic signals (e.g., by circuit or wire), wireless signals (e.g., by satellite, internet, mobile telecommunications technology, a frequency, a wavelength, Bluetooth®), or the like. The control unit 68 may include a memory and programming, such as algorithms. The harvester 10 also includes a global positioning system ("GPS") 70 operatively connected to send signals to the control unit 68. The aforementioned sensors may include a yield monitoring sensor 72, a billet loss sensor 74, a fan speed sensor 76, a load sensor 78, a moisture sensor 80, a trash sensor 82, and a ground speed sensor 84. The control unit 68 is programmed to include a monitoring system that monitors harvester functions, switch states, ground speed, and system pressures as will be described in greater detail below.

The control unit 68 may also have other inputs, such as an elevator speed sensor (not shown) for detecting a speed of the conveyor 56, a chopper speed sensor (not shown) for detecting a speed of the counter-rotating drum cutters 30 or other type of chopper 28, and a base cutter speed sensor (not shown) for detecting a speed of the counter-rotating discs, or other cutting device, of the base cutter. The control unit 68 may also have other outputs, such as for controlling the fan pump 64, the fan motor 50, a pump, valve, or motor (not shown) of the centrifugal blower wheel 46, the speed of the chopper 28, the height, direction, speed, and input control of the base cutter (not shown), the secondary cleaner 60, and the height and input control of the topper 24.

The yield monitoring sensor 72 is coupled to the conveyor 56 and sends a crop yield signal to the control unit 68 corresponding to an amount (e.g., a mass or a volume) of crop being discharged from the discharge opening 58.

The billet loss sensor 74 may include one or more accelerometers and/or any sensor that measures displacement or strain, or the like. The billet loss sensor 74 is associated with the separator 55, or more specifically coupled to the separator 55. For example, the billet loss sensor 74 may be associated with, or coupled to, the cleaning chamber housing 34, the fan enclosure 36, the hood 38, the fan 40, the fan blades 42, the hub 44, the centrifugal blower wheel 46, the right angular blower blades 48, the drive shaft 52, etc., or any of the associated structures. In the illustrated construction, the billet loss sensor 74 is coupled to the hood 38 (FIG. 3). The billet loss sensor 74 is configured for sending a signal to the control unit 68 corresponding to each billet B passing through the separator 55 and, more specifically, out the opening 54. For example, the billet loss sensor 74 includes an accelerometer that detects the impact of a billet B hitting the fan 40 and/or a housing part, such as the hood 38. In other constructions, the billet loss sensor 74 may include a piezoelectric sensor or employ another suitable sensing technology. The billet loss sensor 74 sends a signal to the control unit 68 each time a billet is detected. The control unit 68 records and counts the billets and may associate the billet signal data with a time, a location (e.g., from the GPS 70), etc.

The fan speed sensor 76 may be associated with, or coupled to, the fan 40, and more specifically may be coupled to, for example, the blades 42, the hub 44, the drive shaft 52, etc., or to any suitable location adjacent the fan 40. For example, the fan sensor 76 may include magnets, proximity sensors, Hall Effect sensors, etc., to count revolutions of the blades 42, the drive shaft 52, or other part of the fan 40 and send signals to the control unit 68 corresponding to, and used to determine, the fan speed. The fan sensor 76 may also include other suitable sensing technologies for determining fan speed.

The moisture sensor 80 is positioned to detect moisture of the crop. The moisture sensor 80 may include a near infrared sensor or other suitable moisture-detecting technologies. For example, the moisture sensor 80 is disposed on the harvester 10 and may be positioned in the chopper 28, in the separator 55, and/or in the conveyor 56 and, more specifically, in any of the components of the harvester 10 associated therewith as described above. In the illustrated construction, the moisture sensor 80 is disposed in the separator 55 and, more specifically, in the hood 38. The moisture sensor 80 sends a signal to the control unit 68 corresponding to a level of moisture in the crop.

The trash sensor 82 may include vision technology (e.g., a camera) disposed proximate the conveyor 56 and/or the discharge opening 58 and sending a signal to the control unit 68 corresponding to total yield discharged from the discharge opening 58 and/or an amount of trash being discharged from the discharge opening 58. The trash sensor 82 may quantify the amount of trash as an absolute amount or as a percentage of total yield through the discharge opening 58. The trash sensor 82 may be disposed in the conveyor 56. The trash sensor 82 may include other sensing technologies for determining the amount of trash being discharged from the discharge opening 58.

The ground speed sensor 84, which may include a speedometer, a radar sensor, a velocimeter such as a laser surface velocimeter, a wheel sensor, or any other suitable technology for sensing vehicle speed, is configured to send a ground speed signal to the control unit 68 corresponding to the speed of the harvester 10 with respect to the support surface 16. The ground speed signal may also be sent by the GPS 70.

The load sensor 78 senses a load on the separator 55. For example, the load sensor 78 may measure a load on the motor 50 and may include any suitable type of sensor for the type of motor employed, e.g., electric, pneumatic, hydraulic, etc. In some constructions, the load sensor 78 may include a strain gage(s) for measuring a torque load or an amp meter for measuring an electrical load. The load on the motor 50 may also be measured indirectly, such as by measuring a load on the fan 40 and/or the centrifugal blower wheel 46. In some constructions, such as the illustrated construction employing a hydraulic motor 50, the load sensor 78 may include a pressure transducer, or other pressure sensing technology, in communication with the hydraulic circuit 62 for measuring pressure within the circuit 62. For example, the load sensor 78 may be coupled to the fan motor 50 or to the pump 64 or anywhere along the circuit 62 to measure the associated pressure in the circuit 62. The load sensor 78 sends load signals to the control unit 68.

The load sensor 78 measures a baseline load, or lower load limit, when the harvester 10 is running and no crop is being cut, and a current (or present) load when crop is being cut. The control unit 68 calculates a load delta, or difference between the baseline load and the current load. Using the illustrated construction as an example, the baseline load is a baseline pressure and the current load is a current pressure. The load sensor 78 may monitor, or periodically measure, circuit pressure, i.e., the baseline load. The hydraulic circuit 62 may exhibit a particular baseline pressure, or lower pressure limit, corresponding to activation of the circuit 62 for operation of the harvester 10 without active processing of crop by the harvester 10 (e.g., for rotating the fan 40 without crop passing through the opening 54 of the hood 38). The baseline pressure, or lower pressure limit, may also refer to another suitable related pressure threshold that can be used as a comparison to pressure in the circuit 62 during cutting and cleaning of the crop.

The lower pressure limit for the hydraulic circuit 62 may be monitored (e.g., periodically) during operation of the harvester 10. It will be understood, for example, that changes in oil viscosity as the oil warms or cools, changes in oil level, changes in engine load, and so on, may result in changes to the baseline pressure of the hydraulic circuit 62. For example, due to the warming of hydraulic and gear oil as the harvester 10 operates throughout the day, the hydraulic circuit 62 may be activated (e.g., pressurized for operation) at lower and lower pressures. Therefore, it may be useful to update the appropriate lower pressure limit for the control unit 68 to account for this change and the baseline load is thus monitored.

When the harvester 10 is actively processing the crop (e.g., actively cutting, chopping, transporting, cleaning, etc.), the resistance of the crop moving past or through the harvester 10, e.g., through the separator 55, past the fan 40, to the opening 54 in the hood 38, may cause the pressure of the hydraulic circuit 62 to increase past the lower pressure limit to what will be referred to herein as a current pressure (e.g., the current load). Current pressure, or current load, signals are received by the control unit 68. At any time when a current pressure measurement is recorded by the control unit 68, a corresponding previous lower pressure limit may be paired therewith.

Figure 4:
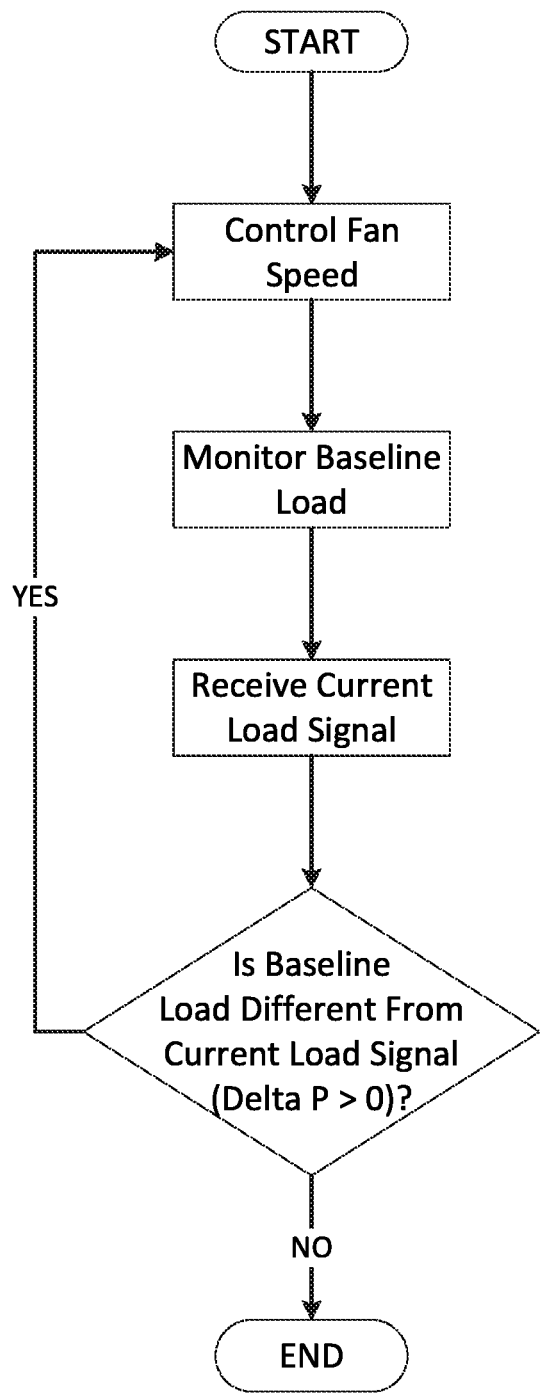
FIG. 4 is a flow chart illustrating a system for controlling a fan speed of the harvester of FIG. 1.

Accordingly, through comparison of the current pressure of the hydraulic circuit 62 to the corresponding lower pressure limit for the circuit 62, the control unit 68 determines delta P (e.g., the difference between the current pressure and the lower pressure limit). Delta P is proportional to a quantity (e.g., as a mass or volume) of crop actively being processed or cleaned by the fan 40, then passing through the hood 38 and the opening 54 and, ultimately, being discharged onto the field as residue. For example, when delta P is zero, then it may be presumed that no crop is being actively processed although the separator 55 may be running. Furthermore, when delta P is greater than zero, then the value of delta P is proportional to the quantity of crop being processed and the fan speed can be controlled in a feedback loop, e.g., increased, to provide a steady level of cleaning of the crop (FIG. 4) based at least in part on the load signal and, furthermore, based on delta P. The level of cleaning will be described in greater detail below.

Figure 5:
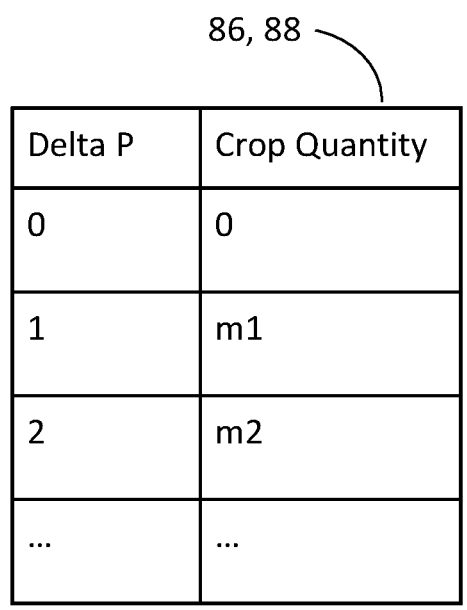
FIG. 5 is a table illustrating a conversion factor in a control system of the harvester of FIG. 1.

A conversion factor 86 representing the relationship between delta P and crop quantity may be used to convert delta P into a corresponding crop quantity, e.g., residue quantity. The conversion factor 86 may factor known or estimated crop mass, moisture, machine functions (e.g., whether the harvester 10 is operating to intake crop), switch states (e.g., whether the harvester 10 machine functions have changed), time, location, and ground speed into the quantification of residue. For example, the conversion factor 86 may include a function, an equation, a multiplier, etc., that can be determined from experimental data and/or from theory. In the illustrated construction, the conversion factor 86 includes a lookup table 88 (FIG. 5) in which the control unit 68 can find a crop quantity (e.g., 0, m1, m2, etc.) corresponding to a value of delta P. For example, when delta P is zero, then the crop quantity being processed is zero, when delta P is 1, then the crop quantity (e.g., residue quantity being ejected on the field 16) is m1, etc. Thus, the control unit 68 quantifies, or expresses, residue as a function of at least load delta (e.g., delta P) and may also express residue as a function of any combination of one or more of load delta, moisture, machine functions, switch states, time, location, and ground speed. Each quantity of residue may be a residue data point collected by the control unit 68 to form a residue data set. Furthermore, the control unit 68 may correlate the quantified residue data points with corresponding GPS signals from the GPS 70 indicating the location of each residue data point, thereby mapping the residue on the field.

In some constructions, as noted, the control unit 68 factors a moisture level of crop, based on a signal received from the moisture sensor 80 into the quantification of residue. The control unit 68 may continuously or periodically monitor the moisture level. Crop having more moisture is heavier and harder to draw through the separator 55 and therefore requires more power from the fan 40. Thus, moist crop may increase the current pressure and skew the residue measurement "high." Accordingly, the control unit 68 may account for moisture in the crop to correct the residue measurement (through the conversion factor 86) using the signal from the moisture sensor 80, by subtracting an amount corresponding to moisture from the current pressure measurement or by subtracting an amount corresponding to moisture from the residue measurement, or in other suitable ways, etc., to arrive at a residue measurement corrected for moisture.

When the billet loss sensor 74 detects an energy or impact above a threshold level (e.g., the energy/impact of a billet B being shattered by the fan 40 and/or impinging on the hood 38), the control unit 68 recognizes that a billet B has passed through the separator 55, thereby counting the number of billets B in the residue being discharged onto the field. Thus, the control unit 68 records billet loss data and may associate the billet loss data with the corresponding residue data and GPS data discussed above, such that an amount of billets B in the residue (e.g., as a ratio or a percentage) can be calculated and mapped. For example, the control unit 68 may be programmed to know an average quantity of crop in each billet (e.g., as a mass or volume) and may then quantify the billets B as a ratio of billet quantity to residue quantity. The control unit 68 may also quantify the billets B as a percentage of total residue quantity. The control unit 68 may also quantify the billets B by counting the number of billets per residue quantity, per distance, and/or per area of field, etc. Furthermore, the billets B may be quantified in any other type of numerical representation or a non-numerical representation, such a comparison of the billets B to a baseline, another value, or a pre-set level, etc. It should be understood that any quantification described herein need not be an exact determination of actual quantity and may include an estimate, approximation, or relative comparison.

Figure 6:
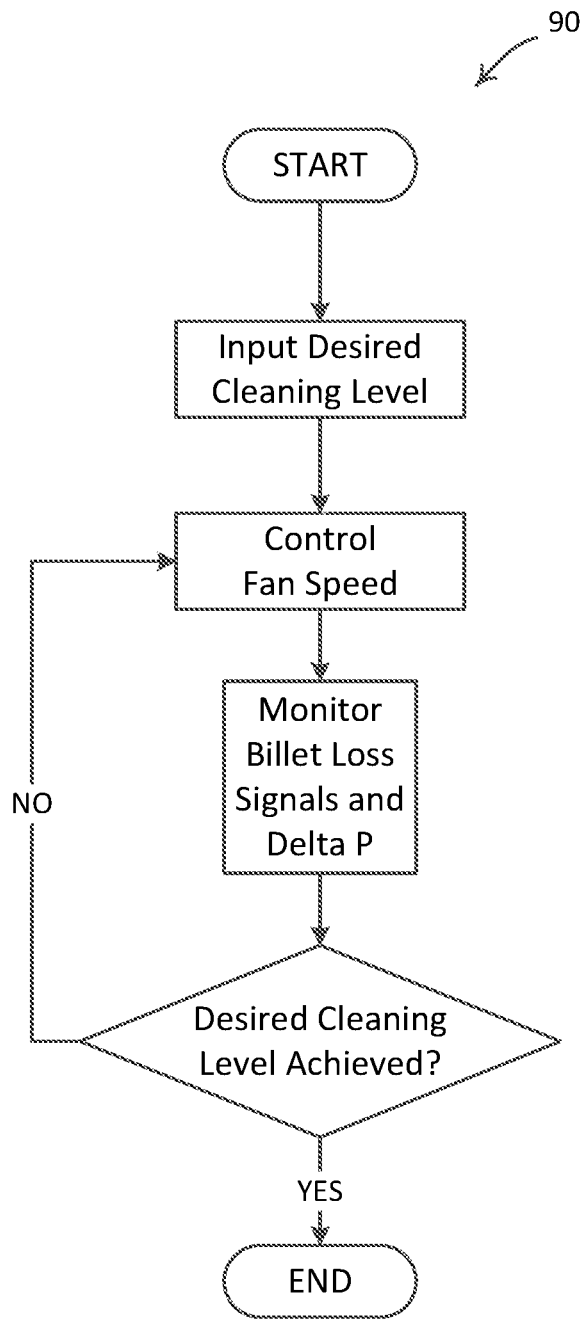
FIG. 6 is a flow chart illustrating a controlled cleaning system of the harvester of FIG. 1.

The control unit 68 includes a controlled cleaning system (the sequence 90 of which is illustrated in FIG. 6) allowing the user to input a desired level of cleaning. Alternatively, the desired level of cleaning may be input into the controlled cleaning system by a sensor, such as a sensor indicating a percentage of leaf trash. The desired level of cleaning may be expressed as a desired level of billet present in the residue, e.g., as a percentage of the residue or as any other billet quantification discussed above. The operator may input a desired level of cleaning as an absolute or a relative amount of clean, e.g., as a numerical input (e.g., percentage, ratio, number of billets per residue quantity, distance, field area, etc.) or as a non-numerical input, such as on a scale, a gradient, a color-coded indicator, a knob, a haptic input, etc., or may input a desired increase or decrease of the level of cleaning, for example by an increase/decrease switch or button(s), etc.

The level of billet present in the residue generally corresponds inversely with a level of trash passing through the conveyor discharge opening 58, e.g., the more billet in the residue, the less trash is discharged from the discharge opening 58 and vice versa. Thus, the controlled cleaning system may also, or alternatively, allow the user to input a desired level of cleaning as a desired level of trash passing through the conveyor outlet 58, e.g., as a percentage of the total crop passing through the conveyor outlet or any other suitable measure. The controlled cleaning system 90 may also convert an inputted desired level of billet to a desired level of trash and vice versa.

The level of cleaning achieved is dependent on the suction pressure generated by the fan 40, which is proportional to a fan speed of the fan 40. The higher the fan speed, the more billet B is drawn through the separator 55 and the less trash is discharged from the discharge opening 58. Thus, the fan speed can be controlled to achieve a desired level of cleaning, as illustrated in FIG. 6. The user may input a desired level of cleaning (e.g., as one of the billet or trash quantifications described above or as a symbol or term corresponding with one of the quantifications described above) into the operator interface 66, which communicates the desired level of cleaning to the control unit 68 (e.g., the controlled cleaning system), which controls the fan speed to achieve the desired level of cleaning. The fan speed sensor 76 continuously or periodically sends a speed signal to the control unit 68. In a feedback loop (FIG. 6), the control unit 68 continuously or periodically monitors the billet loss signals from the billet loss sensor 74 and the delta P to determine a measured, or actual, cleaning level and controls the fan speed, based on the signal from the fan sensor 76, to adjust the cleaning level to achieve the desired cleaning level inputted by the operator. Achieving the desired cleaning level may include, among other things, the measured cleaning level at least coming within a predefined acceptable range of the desired cleaning level. The control unit 68 may control fan speed by controlling the motor 50, the pump 64, or other motive devices.

For example, the controlled cleaning system 90 may continuously or periodically calculate the cleaning level in terms of a percentage of billet B in the total residue, e.g., by calculating a proportion of the energy/impact sensed by the billet loss sensor 74 to the corresponding residue data. To achieve the desired cleaning level, the control unit 68 may continuously or periodically adjust the fan speed until the percentage of billet B achieves (e.g., is approximately equal to, or within a threshold close to) the desired cleaning level. The controlled cleaning system 90 may calculate the cleaning level by calculating trash as a percentage of crop discharged from the discharge opening 58. As discussed above, the level of billet and the level of trash are inversely related, thus the control unit 68 may use either as a measure of cleaning level and can convert between the two. If the level of trash is to be used, the controlled cleaning system 90 may calculate the percentage of trash in the crop discharged from the discharge opening 58 (instead of percentage of billet B) by comparing the signals from the trash sensor 82 and the yield monitoring sensor 72.

The controlled cleaning system 90 may also adjust the fan speed based on the moisture signal from the moisture sensor 80. As discussed above, moisture makes crop heavier and harder to clean. The controlled cleaning system may increase the fan speed as more moisture is detected to improve the effectiveness of cleaning.

The controlled cleaning system 90 may also control ground speed of the harvester 10. For example, the controlled cleaning system may be operatively coupled to the throttle 11 to control the prime mover (not shown) to effectuate changes in the ground speed of the harvester 10. Changes in the ground speed may affect the cleaning level of the crop. The faster the harvester 10 moves through the field, the higher the rate of crop intake and, conversely, the slower the harvester 10 moves through the field, the lower the rate of crop intake. Raising the rate of crop intake (i.e., increasing ground speed) without changing the parameters of the crop cleaner will cause the crop cleaning level to go down, i.e., the crop ejected from the discharge 58 will be less clean, having more trash by percentage. Conversely, lowering the rate of crop intake (i.e., decreasing the ground speed) without changing the parameters of the crop cleaner will cause the crop cleaning level to go up, i.e., the crop ejected from the discharge 58 will be more clean, having less trash by percentage. As such, the ground speed may be controlled to adjust the actual cleaning level towards the desired cleaning level. Ground speed may be controlled alone or in conjunction with the other control methods discussed above, such as adjusting the parameters of the crop cleaner, to achieve the desired cleaning level.

In another construction, the controlled cleaning system 90 may recommend a change in ground speed of the harvester 10 to the operator. For example, the controlled cleaning system may display a message, or suggestion, to the operator by way of a display on the user interface 66 recommending that the operator effectuate changes in the ground speed of the harvester 10 to adjust the cleaning level as discussed above. The message may be in the form of a recommendation that the operator manually adjusts the throttle 11 to effectuate the change in ground speed, or may be in the form of a question requesting permission to automatically adjust the ground speed (as discussed above). The recommendation may be specific (e.g., recommending a specific new ground speed) or general (e.g., recommending an increase or a decrease in ground speed). Ground speed may be controlled alone or in conjunction with the other control methods discussed above, such as adjusting the parameters of the crop cleaner, to achieve the desired cleaning level.

In operation, the stalks of crop are conveyed from the base cutter 26 to the chopper 28. The chopper 28 chops the crop and delivers a stream of cane billets B and extraneous plant matter to the cleaning chamber 32 by way of the counter-rotating drum cutters 30. Extraneous plant matter and billets B are at least partially separated by the separator 55. The control unit 68 monitors a load on the separator 55, such as a pressure in the hydraulic circuit 62, and quantifies the crop residue based on at least the load signal. Moisture may be accounted for in quantifying the crop residue. The controlled cleaning system 90 monitors baseline load, such as baseline pressure in the hydraulic circuit 62, and subtracts the baseline load from current load, such as pressure in the hydraulic circuit 62 during crop separation. The control unit 68 also quantifies billets B passing through the residue opening 54 using signals from the billet loss sensor 74 and can express the level of crop cleaning based on how much billet is being ejected with the residue from the opening 54 (outlet) back to the field. The control unit 68 also quantifies the trash using the trash sensor 82 and crop yield using the yield monitoring sensor 72 and expresses the level of crop cleaning based on how much trash is being ejected with the billets B from the discharge opening 58 (outlet) at the top of the conveyor 56. Thus, the control unit 68 monitors the actual cleaning level of the crop. Based on the operator-inputted desired cleaning level and the actual cleaning level feedback, the control unit 68 controls the fan 40 speed to achieve the desired cleaning level of the crop. Thus, the control unit 68 controls the fan 40 speed based at least in part on the load signal. More specifically, the control unit 68 controls the fan 40 speed based at least in part on a comparison between the baseline load and the current load. The control unit 68 may account for moisture, e.g., by increasing the fan speed 40 with increased crop moisture to improve crop cleaning when the crop is wet.

Thus, the disclosure provides, among other things, a harvester having a controlled cleaning system for quantifying crop residue and automatically controlling the separator 55 to achieve a desired level of crop cleaning inputted by the operator. Various features and advantages of the disclosure are set forth in the following claims.

What is claimed is:

1. A control system for a harvester having a crop cleaner for cleaning a cut crop, the crop cleaner including a fan, the control system including a processor, a memory, and a human-machine interface, the processor configured to:
    receive an input corresponding to a desired cleaning level of the crop;
    monitor an actual cleaning level by measuring a load on the fan; and
    control the crop cleaner based at least in part on feedback from monitoring the actual cleaning level, wherein the control includes moving the actual cleaning level of the crop during harvester operation towards the desired cleaning level of the crop.

2. The control system of claim 1, the processor further configured to monitor the actual cleaning level by quantifying at least one of billets or trash passing through an outlet of the harvester.

3. The control system of claim 2, the processor further configured to:
    quantify the total crop passing through the outlet, wherein the cleaning level is a percentage or a ratio of the total crop passing through the outlet being at least one of billets or trash.

4. The control system of claim 1, wherein the processor is further configured to:
    quantify the crop passing through an outlet of the harvester based at least in part on a first signal received from a load sensor configured to measure the load on the fan as a load on a motor operatively coupled to drive the fan; and
    quantify billets passing through the outlet based at least in part on a second signal received from a billet loss sensor configured to detect billets passing through the outlet.

5. The control system of claim 4, wherein the load sensor includes a pressure sensor configured to measure pressure in a hydraulic circuit operatively coupled to the motor.

6. The control system of claim 5, wherein the processor is further configured to:
    monitor a baseline pressure of the hydraulic circuit; and
    quantify the crop by comparing the measured pressure to the baseline pressure of the hydraulic circuit.

7. The control system of claim 1, wherein the processor is further configured to control a speed of the fan speed by controlling a pump for a hydraulic circuit configured to drive the fan.

8. The control system of claim 1, wherein the input corresponding to a desired cleaning level of the crop includes at least one of input from a user or input from a sensor.

9. The control system of claim 1, wherein the crop cleaner includes at least one of a fan, a source of compressed air, a shaker, or a rake.

10. A control system for a harvester having a fan for cleaning a crop and a motor for driving the fan, the control system including a processor, a memory, and a human-machine interface, the processor configured to:
    receive a load signal corresponding to a load on the motor; and
    control a speed of the fan based at least in part on the load signal.

11. The control system of claim 10, wherein the processor is further configured to receive an input corresponding to a desired cleaning level of crop and to control at least one of harvester ground speed or the speed of the fan to cause an actual cleaning level of crop to approach the desired cleaning level of crop.

12. The control system of claim 10, wherein the processor is further configured to:
    monitor a baseline load on the motor;
    compare the baseline load to the load signal;
    control the fan speed at least in part based on the comparison.

13. The control system of claim 10, wherein the load signal corresponds to a current hydraulic pressure sensed in a hydraulic circuit associated with the motor, wherein the motor is a hydraulic motor.

14. The control system of claim 13, wherein the processor is further configured to:
    monitor a baseline pressure of the hydraulic circuit;
    compare the baseline pressure to the current hydraulic pressure;
    control the speed of the fan at least in part based on the comparison.

15. A harvester comprising:
    an inlet for receiving a crop including stalks and extraneous plant matter;
    a blade for cutting the stalks into billets and the extraneous plant matter into cut extraneous plant matter;
    a separator including:
        a cleaning chamber for at least partially separating the billets and the cut extraneous plant matter,
        a crop cleaner for separating portions of the crop in the cleaning chamber, and
        a hood having a residue outlet;
    a sensor configured to generate a load signal corresponding to a load on the separator; and
    a control unit configured to receive the signal from the sensor, wherein the control unit is programmed to quantify the crop ejected from the residue outlet based on at least the load signal.

16. The harvester of claim 15, wherein the control unit is programmed to quantify the crop ejected from the residue outlet at least in part by subtracting a baseline load from a current load to generate a load delta corresponding to a quantity of the crop passing through the residue outlet.

17. The harvester of claim 16, wherein the control unit is further programmed to include a conversion factor for expressing the quantity of crop as a function of the load delta.

18. The harvester of claim 15, wherein the separator further includes a motor operatively coupled to the crop cleaner, wherein the motor is a hydraulic motor coupled to a hydraulic circuit and wherein the load signal corresponds to a hydraulic pressure associated with the hydraulic circuit.

19. The harvester of claim 15, further comprising a global positioning system generating a position signal, wherein the control unit is programmed to geospatially map the crop ejected from the residue outlet based on the position signal.

20. The harvester of claim 15, wherein the crop cleaner includes at least one of a fan, a source of compressed air, a shaker, or a rake.

* * * * *